US011812032B2

(12) United States Patent
Pandit et al.

(10) Patent No.: US 11,812,032 B2
(45) Date of Patent: Nov. 7, 2023

(54) CONTENT ADAPTIVE ENCODING

(71) Applicant: Home Box Office, Inc., New York, NY (US)

(72) Inventors: Purvin Bibhas Pandit, Franklin Park, NJ (US); Timothy J. Obremski, Ridgewood, NY (US)

(73) Assignee: HOME BOX OFFICE, INC., New York, NY (US)

( * ) Notice: Subject to any disclaimer, the term of this patent is extended or adjusted under 35 U.S.C. 154(b) by 0 days.

(21) Appl. No.: 18/051,292

(22) Filed: Oct. 31, 2022

(65) Prior Publication Data
US 2023/0085928 A1 Mar. 23, 2023

Related U.S. Application Data

(63) Continuation of application No. 16/883,405, filed on May 26, 2020, now Pat. No. 11,503,302.
(Continued)

(51) Int. Cl.
*H04N 19/14* (2014.01)
*H04N 19/105* (2014.01)
(Continued)

(52) U.S. Cl.
CPC .......... *H04N 19/14* (2014.11); *H04N 19/105* (2014.11); *H04N 19/132* (2014.11); *H04N 19/142* (2014.11); *H04N 19/146* (2014.11)

(58) Field of Classification Search
None
See application file for complete search history.

(56) References Cited

U.S. PATENT DOCUMENTS

2019/0028529 A1 1/2019 Katsavounidis
2019/0075299 A1* 3/2019 Sethuraman ......... H04N 19/132
(Continued)

FOREIGN PATENT DOCUMENTS

WO 2016/160295 A1 10/2016
WO 2018/102756 A2 6/2018

OTHER PUBLICATIONS

International Search Report and Written Opinion received for PCT Application Serial No. PCT/US2021/032794 dated Jul. 14, 2021, 24 pages.
(Continued)

*Primary Examiner* — Samuel D Fereja
(74) *Attorney, Agent, or Firm* — Amin, Turocy & Watson, LLP

(57) ABSTRACT

The described technology is generally directed towards developing an adaptive bitrate stack (ladder) on a per-title basis. Variable bitrate encodings are used to obtain complexity information for a title and per-frames scores for the encodings; another encoding provides scene data. The complexity information is analyzed and processed based on the scene data to determine scene-based (e.g., objective and/or subjective quality) scores, which are used to determine scores for the encodings. The results are used to derive a candidate stack, comprising various resolutions and bitrates that provide desirable results. The candidate stack is evaluated by encoding the title using the candidate stack. These encodings are evaluated to select one resolution from any duplicate resolutions for a bitrate (e.g., based on relative quality), resulting in a pruned, final ladder that is associated with the title as the adaptive bitrate stack to be used for streaming that title's content.

20 Claims, 14 Drawing Sheets

Related U.S. Application Data

(60) Provisional application No. 63/027,310, filed on May 19, 2020.

(51) Int. Cl.
*H04N 19/146* (2014.01)
*H04N 19/142* (2014.01)
*H04N 19/132* (2014.01)

(56) References Cited

U.S. PATENT DOCUMENTS

| | | | |
|---|---|---|---|
| 2020/0296362 A1 | 9/2020 | Chadwich et al. | |
| 2020/0351504 A1 | 11/2020 | Sen et al. | |
| 2021/0160550 A1* | 5/2021 | Katsavounidis | H04N 19/103 |
| 2021/0160558 A1* | 5/2021 | Sorkin | H04N 21/262 |

OTHER PUBLICATIONS

Anne Aaron et al: "Per-Title Encode Optimization",Dec. 12, 2015, 8 pages.
Non Final Office Action issued by the United States Patent Office for U.S. Appl. No. 16/883,405 dated Jul. 8, 2021, 42 pgs.
Final Office Action issued by the United States Patent Office for U.S. Appl. No. 16/883,405 dated Nov. 30, 2021, 58 pgs.
Non Final Office Action issued by the United States Patent Office for U.S. Appl. No. 16/883,405 dated May 17, 2022, 59 pgs.

* cited by examiner

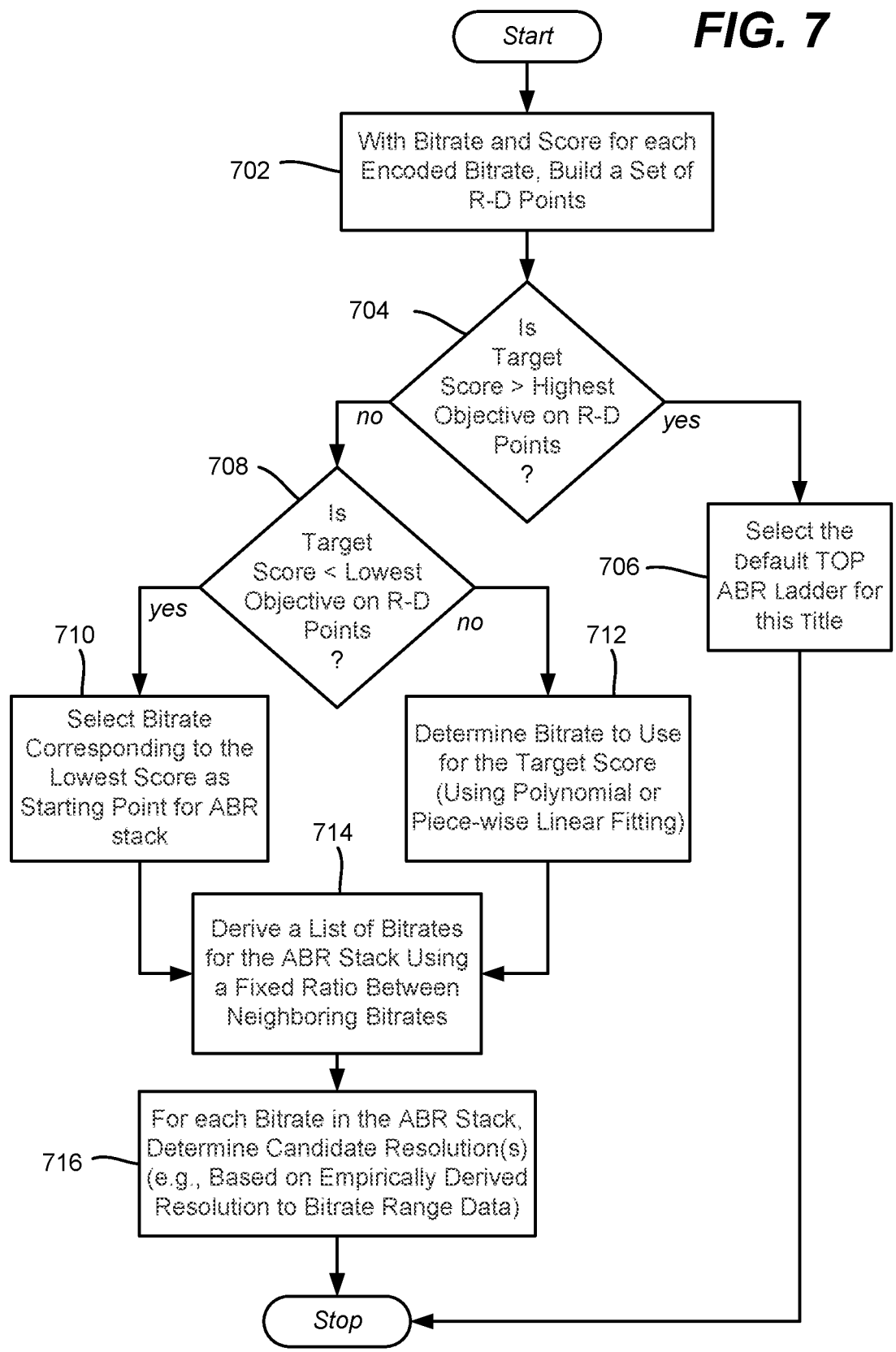

CONTENT ADAPTIVE ENCODING

COPYRIGHT DISCLAIMER

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATION

This application is a non-provisional of co-pending U.S. patent application Ser. No. 16/883,405, filed May 26, 2020, which claims priority to U.S. Provisional Patent Application No. 63/027,310, filed on May 19, 2020. The entireties of the aforementioned applications, both entitled "CONTENT ADAPTIVE ENCODING," are hereby incorporated herein by reference.

BACKGROUND

Contemporary streaming of video content uses adaptive bitrate streaming, in which a receiving device can obtain short segments (e.g., generally a few seconds) of the streamed content at different bitrates and resolutions. For example, if bandwidth is low, rather than performing buffering, which undesirably pauses the video, some number of segments of the content can be received at a lower bitrate, typically at the cost of resolution. If bandwidth increases, the device can increase the bitrate/resolution for the next segments, and so on. An encoding ladder (sometimes referred to as an adaptive bitrate stack or profile) provides the various bitrate and resolution options that are available from the streaming service, from which the device can select as needed to avoid buffering while providing at least a reasonable resolution.

In many existing streaming platforms, the encoding stack is fixed for the multiple pieces of content made available; that is, a static adaptive bitrate ladder is used. However, encoding every piece of content with a fixed adaptive bitrate ladder is inefficient in terms of bits used for the content. These additional bits result in using more storage than needed as well as having to deliver the additional bits to the customer, which increases the content delivery network's costs. Still further, using a fixed adaptive bitrate ladder can result in poorer perceived quality by the customers than what is otherwise possible.

BRIEF DESCRIPTION OF THE DRAWINGS

The technology described herein is illustrated by way of example and not limited in the accompanying figures in which like reference numerals indicate similar elements and in which:

FIG. 7 is a flow diagram of example operations that may be performed to determine a candidate adaptive bitrate stack (ladder) based on the complexity data of a title, in accordance with various aspects and example implementations of the subject disclosure.

DETAILED DESCRIPTION

Various aspects described herein are generally directed towards a "per-title" encoding technology in which different "titles" of content are encoded, based on the complexity of each title's content, into different resolutions and bitrates, corresponding to different adaptive bitrate stacks. In this way, any title can have a customized adaptive bitrate associated therewith that is based on that particular title's complexity.

By way of example, a recorded sports event title, with a relatively significant amount of motion, textures, colors and so forth is generally more complex than a cartoon title. By the technology described herein, an adaptive bitrate stack can be generated for and associated with the sports event title that is different from another adaptive bitrate stack generated for and associated with the cartoon title. In general, because an adaptive bitrate stack for a title is based on the title's actual content, the adaptive bitrate stack is more optimal in terms of more efficient use of bits and/or quality of service than a generic adaptive bitrate stack, for example.

In one example implementation, a data collection operation based on multiple, different bitrate encodings of a title provides the complexity information for a title. The complexity information is reflected in quality scores obtained by encoding the title at the various bitrates and evaluating quality for each of the bitrate encodings. In one aspect, the title's complexity-related information is analyzed based on a per-scene quality metric, which is then used for developing a candidate adaptive bitrate stack (ladder) for that title. The candidate adaptive bitrate stack is encoded, and pruned based on per-scene quality into a final adaptive bitrate stack. The final adaptive bitrate stack is then associated with the title and used for streaming the title's content to customer devices.

It should be understood that any of the examples herein are non-limiting. For instance, to obtain the complexity-related information for a title, various, evenly distributed bitrates are used to encode the content of a title at a selected resolution. However a greater or lesser number of such bitrates can be used to obtain the complexity-related information, as can a different resolution. In other instances, values such as threshold values, percentages, limits and the like are non-limiting examples. As such, the technology described herein is not limited to any particular embodiments, aspects, concepts, structures, functionalities, values or examples described herein. Rather, any of the embodiments, aspects, concepts, structures, functionalities or examples described herein are non-limiting, and the present technology may be used in various ways that provide benefits and advantages in computing and content streaming in general.

Figure 1:
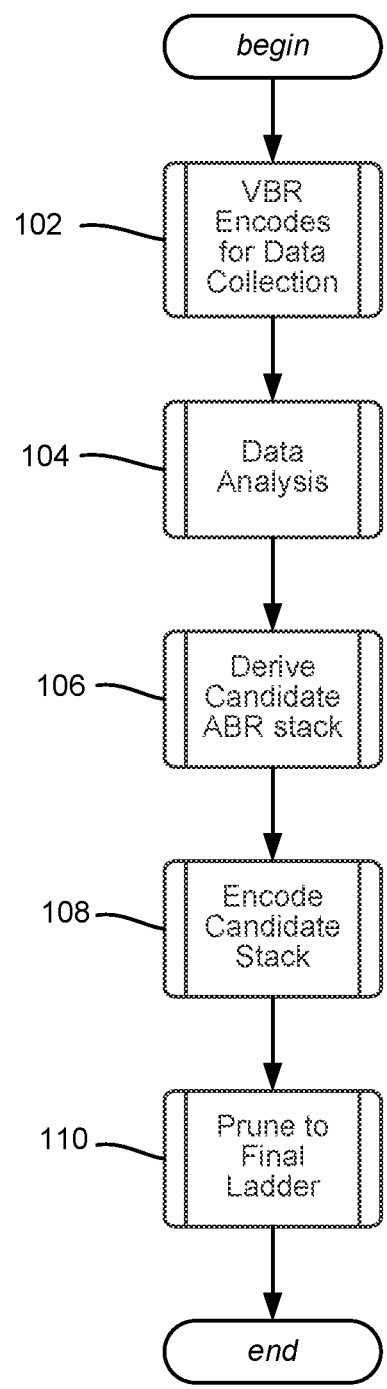
FIG. 1 is an example block diagram representation of an overall flow for determining a per-title adaptive bitrate stack (ladder), in accordance with various aspects and example implementations of the subject disclosure.

FIG. 1 is a generalized, high-level flow diagram representing the various operations used to develop a final ladder (adaptive bitrate stack) associated with a piece of content/asset, generally referred to as a "title" herein. In an operation 102, variable bitrate encodings are used to obtain the complexity information that is analyzed and otherwise processed (operation 104), including based on quality evaluation as described herein.

The analysis is used to derive a candidate stack, comprising various resolutions and bitrates that will provide desirable results, as represented by operation 106. However, the candidate stack can have multiple possible bitrates for the same resolution, and thus the candidate stack is evaluated by encoding the title using the resolution and bitrates of the candidate stack, as represented by operation 108. These encodings are evaluated and pruned based on relative quality, resulting in a final ladder (operation 110) that is then associated with the title as the adaptive bitrate stack to be used for streaming that title.

Figure 2:
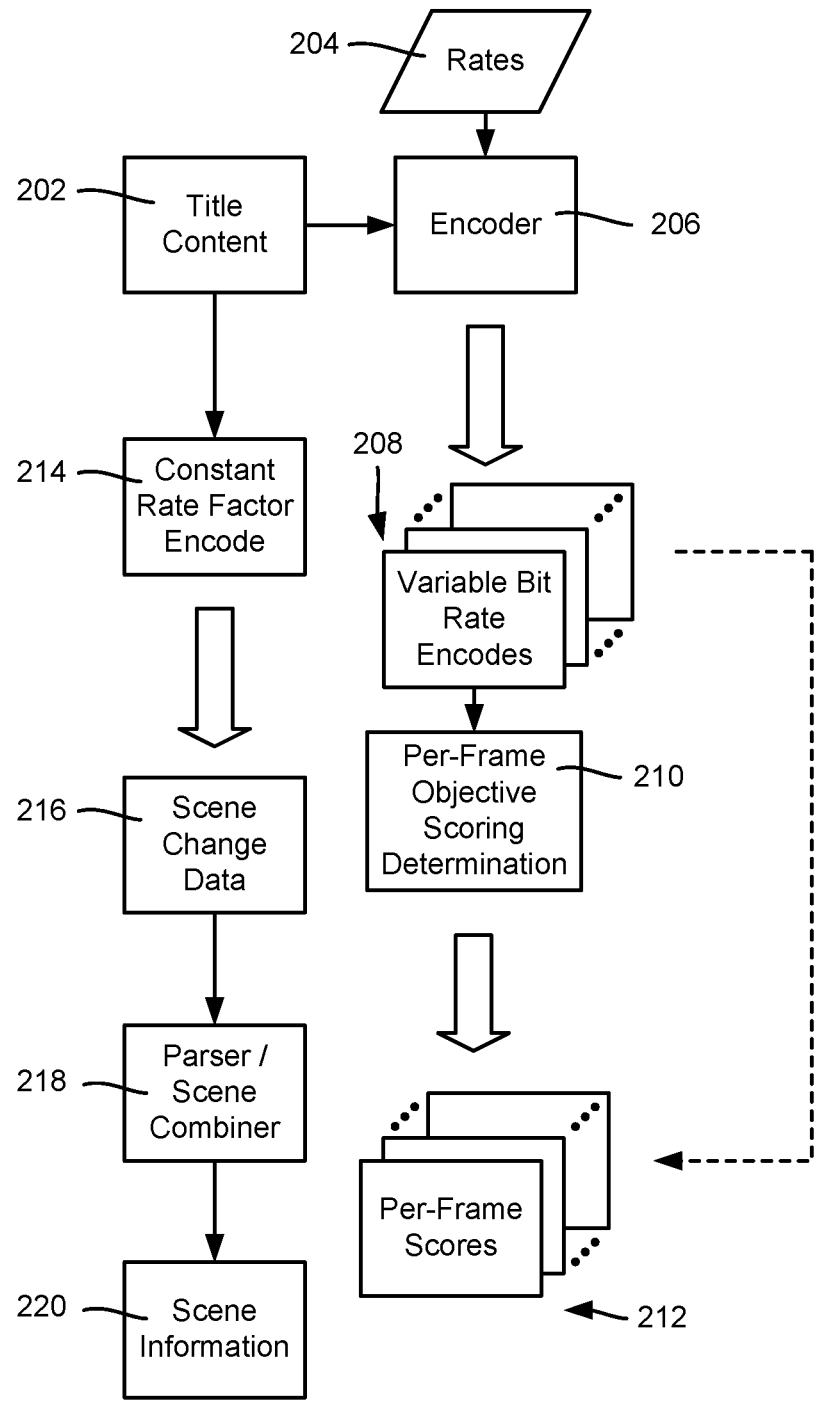
FIG. 2 is an example block diagram representation of components and data that corresponding to obtaining complexity data using variable bitrate encodings of a title that are used as part of developing the adaptive bitrate ladder, in accordance with various aspects and example implementations of the subject disclosure.
Figure 3:
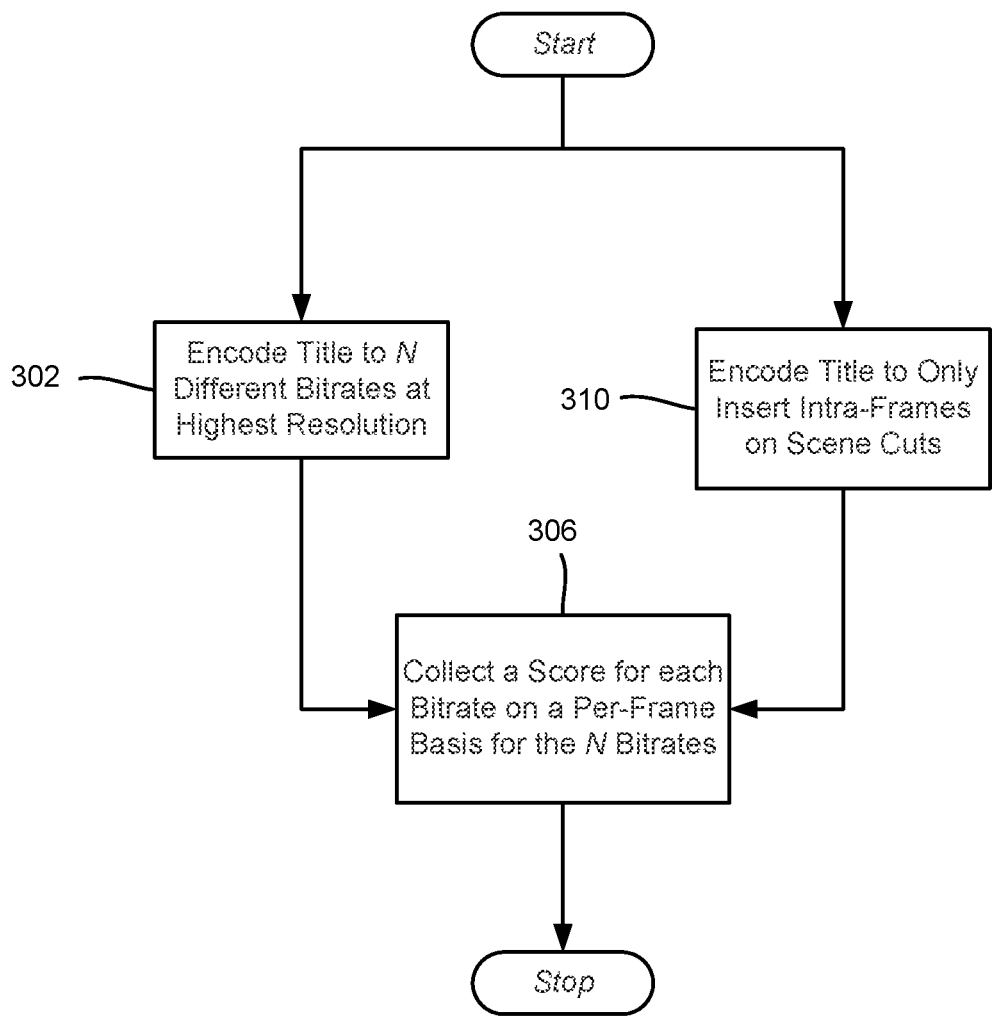
FIG. 3 is a flow diagram showing example operations related to obtaining the variable bitrate encodings and per-frame scores for the encodings, in accordance with various aspects and example implementations of the subject disclosure.

With respect to obtaining the complexity information, FIGS. 2 and 3 show a block diagram and flow diagram, respectively. This aspect encoding the title to multiple variable bitrates at a selected resolution (1920×1080 in this example, but a higher or lower resolution may be used), and an additional encode to capture the scene changes.

In one example implementation, the title (block 202 in FIG. 2) is encoded by a suitable encoder 206 with different bitrates 204, ranging from 2000 k to 8500 k in 500 k increments, where k represents kilobits per second, e.g., (a 2000 k bitrate equals 2 megabits per second). This results in fourteen variable bitrate encodes 208. It should be noted that the configuration for these encodes matches close to what would be used in a production setup. This is also shown via operation 302 of FIG. 3, where Nis fourteen in this example. As can be readily appreciated, the number of encodes can be different from fourteen; for example, if a title's content is known to be of one type, such as animation, a different total number of bitrate encodings, a different range and/or bitrate increments (which need not be evenly distributed) can be used relative to another type of title, such as an action movie. Indeed, the number can be variable based on machine learning; for example, the number of bitrate encodings, the range of bitrates and/or the bitrate increments can be adapted to what is learned.

The following shows an example including variable values for a suitable variable bitrate (VBR) encoding configuration:

| VBR Encode Config |
| --- |
| "video_vbr_config": {<br>  "codec": "h264",<br>  "preset": "medium",<br>  "refs": 4,<br>  "max_bframes": 3,<br>  "use_cabac": true,<br>  "use_scene_detection": true,<br>  "use_closed_gop": true,<br>  "chroma_format": "yuv420p",<br>  "profile": "high",<br>  "bitrate_mode": "vbr",<br>  "gop_size": 96,<br>  "number_of_passes": 2<br>}, |

For each encoded variable bitrate stream, a corresponding frame-based score (e.g., a Video Multimethod Assessment Fusion, or VMAF) score is also calculated and stored in a corresponding (e.g., JSON/JavaScript Object Notation) file. This is shown in FIG. 2 via blocks 210 and 212, and in FIG. 3 via operation 306. Using the bitrate and corresponding VMAF can gives a rate-distortion curve (R-D data points) for a title.

In addition to the variable bitrate encode, a secondary, constant rate factor (CRF) encode is performed, e.g., using CRF=27. This encode, represented by block 214 in FIG. 2 and operation 310 in FIG. 3, is configured specifically to capture only the scene changes (data) 216, as would be detected by an encoder during a real encode. Note that this encode does not enable a periodic group of pictures (GOP) structure like the variable bitrate encodes do.

---
SCD detect Encode
---

```
"video_config_nongop": {
    "codec": "h264",
    "preset": "fast",
    "refs": 4,
    "max_bframes": 3,
    "use_cabac": true,
    "use_scene_detection": true,
    "x264_options": "keyint=infinite:min-keyint=1"
}
```

---

As part of this operation, the key frame information, including the frame type (e.g., I-frame or other type) and size (e.g., in bits) of each frame is also collected in a separate (e.g., JSON) file. An example command for this operation is shown below:

---
Frame Type Info
---

"command_line": "ffprobe -i {source_0_0} -select_streams v:0 -show_frames -print_format json -show_entries streams=frames:frame=key_frame,pkt_size,pict_type,coded_picture_number > {frametype_result}"

---

At this point, the complexity information for the title has been generated. Note that any other suitable type complexity information can be used, and the above operations are only non-limiting examples.

To analyze the complexity information, in one example implementation, the scene change data is used to group the frames into scenes. More particularly, operation 104 of FIG. 1 takes the complexity information/data obtained via operation 102 of FIG. 1 to calculate an overall/single VMAF score for each of the target variable bitrate encodings. Simply taking the average of all the frames, as is often done for a title, does not tend to provide suitable results. Instead, as described herein, scene-based scores are obtained, e.g., to derive a VMAF score for each bitrate encoding based on the different scenes in the title.

To collect information about the scenes in the title, the "Frame Type Info" file is accessed to determine scenes. It should be noted that the encoder can encode very short scenes, and thus described herein is consolidating such short scenes, which generally makes the results more meaningful.

To consolidate scenes, the frame information is parsed to collect information about each scene. As represented via operation 502 of FIG. 5, the collected information stored for each scene includes scene start frame number, number of frames in the scene, scene size in bits and average scene bit rate. For each frame in the file, if the frame is an I-frame, the frame is the beginning of a new scene; if so, this resets the current scene's frame count and scene size. The process then sets the current scene's start frame number, and determines the number of frames in scene, the scene size (bits) and the average scene bit rate. That is, frames that are not I-frames are still in the same scene, which for each such frame increments the frame count in the scene, increases the scene size, and thus changes the average scene bit rate.

Figure 5:
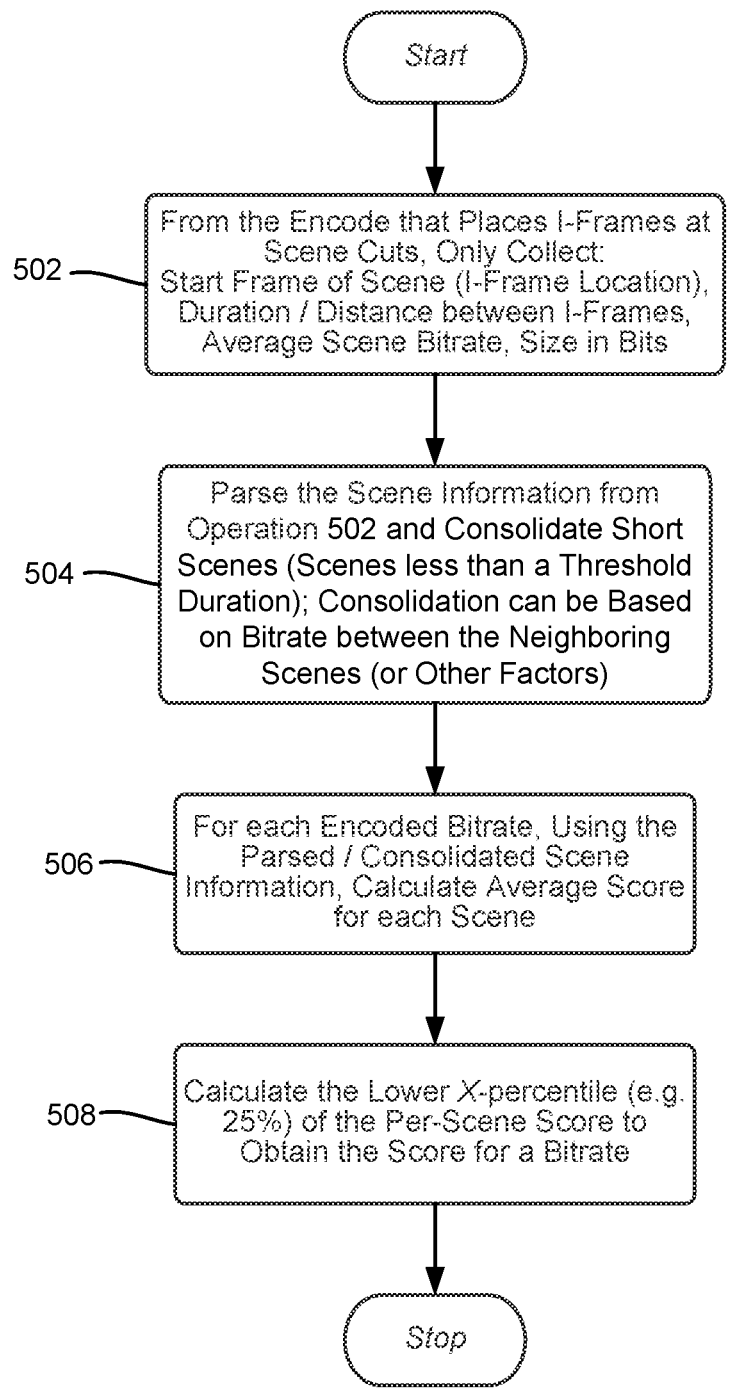
FIG. 5 is a flow diagram of example operations that may be performed to process scene data and the per-frame data into scores for scenes of the encodings, and using the scene scores determine final scores for the encodings based on per-scene scores, in accordance with various aspects and example implementations of the subject disclosure.

As represented via operation 504 of FIG. 5, with the information about each scene, some smaller scenes are consolidated so that there are not too many short scenes and/or scenes with similar bit rates. To do this, for each scene, if the scene length is below a threshold (e.g., two seconds), the "small" scene is combined with a neighboring scene, that is, either the previous scene or the next scene; (if needed, this can be done with more than one consecutive short scene until the threshold is reached). In one implementation, the criterion used to combine with previous or next is based on how close the bitrate of the current scene is with each of the neighboring scenes; the neighboring scene that is closest in bitrate is combined with the short scene. If the scene length is larger than the threshold, the scene is kept unchanged. A different criterion/other factor for choosing between neighbors can be scene similarity, and so forth.

Once the scenes are identified and consolidated as appropriate, a VMAF calculation is performed based on the scenes, which as described herein will eventually be used to determine an overall VMAF score, (that is, fourteen scores in this example), one for each of the different bitrate encodings. To this end, using the previous (parsed and consolidated) scene information 220, as represented via block 440 in FIG. 4, the average VMAF score for each scene is computed, based on the per-frame VMAF scores 212, e.g., the per-frame VMAF scores summed for the frames of each scene divided by the number of frames in that scene. These results are represented via block 442 in FIG. 4 and operation 506 of FIG. 5.

Figure 4:
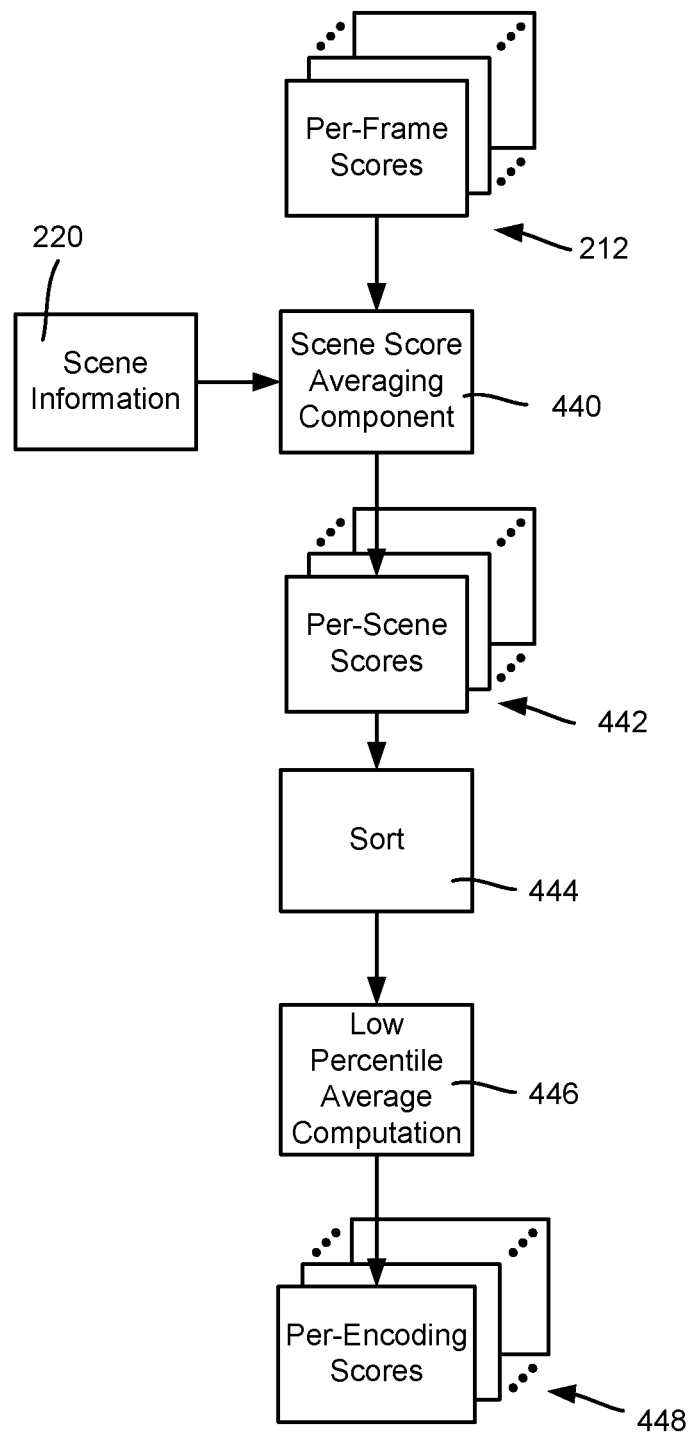
FIG. 4 is an example block diagram representation of components and data that can be used to determine final (objective and/or subjective) scores for the encodings based on per-scene data, in accordance with various aspects and example implementations of the subject disclosure.

Once the average VMAF score per scene is obtained for a bitrate encoding, the scene, the VMAF scores can be sorted, as represented by block 444 of FIG. 4. The VMAF score for a bitrate encoding is based on the average of a lower X-percentile of the VMAF scores, as represented by block 446 of FIG. 4 and via operation 508 of FIG. 5. In one implementation, this is the lowest twenty-fifth percentile, that is, X=25. In this way, each bitrate encoding is associated with a single VMAF score computed from its scenes, shown in FIG. 4 as a group of per-encoding (e.g., VMAF) scores 448, which can be maintained as a single (e.g., JSON) file as shown in the following table:

---

```
{
    "title_id": "title_01.mxf",
    "title_name": "title_01.mxf",
    "crf_data": [
        {
            "bitrate_kbps": 4000.0,
            "vmaf": 91.79432000239605
        },
        {
            "bitrate_kbps": 2000.0,
            "vmaf": 87.12261074665088
        },
        {
            "bitrate_kbps": 3000.0,
            "vmaf": 90.4783109024129
        },
        {
            "bitrate_kbps": 2500.0,
            "vmaf": 89.2227637894286
        },
        {
            "bitrate_kbps": 3500.0,
            "vmaf": 91.2375642620417
        },
        {
            "bitrate_kbps": 5000.0,
            "vmaf": 92.55660319825606
        },
        {
            "bitrate_kbps": 4500.0,
            "vmaf": 92.2134084723275
        },
```

-continued

```
    {
        "bitrate_kbps": 6500.0,
        "vmaf": 93.34540187748469
    },
    {
        "bitrate_kbps": 6000.0,
        "vmaf": 93.12047211532578
    },
    {
        "bitrate_kbps": 5500.0,
        "vmaf": 92.86660113666714
    },
    {
        "bitrate_kbps": 7500.0,
        "vmaf": 93.70631225542456
    },
    {
        "bitrate_kbps": 7000.0,
        "vmaf": 93.53842345490895
    },
    {
        "bitrate_kbps": 8000.0,
        "vmaf": 93.8747315693303
    },
    {
        "bitrate_kbps": 8500.0,
        "vmaf": 94.03146014833186
    }
    ],
    "height": 1920,
    "width": 1080
}
```

In a next part of the process (corresponding to operation 106 of FIG. 1), a candidate ladder is derived, based on the bitrates, their corresponding encodings' VMAF scores and a target VMAF (e.g., a value of 92 is used in this example). More particularly, an initial target (highest) bitrate is determined as described herein, with other, lower candidate bitrates for the candidate ladder determined based on the target bitrate. From there, a fixed table is used to select one or more resolutions for each of the candidate bitrates to complete the candidate ladder.

Figure 6A:
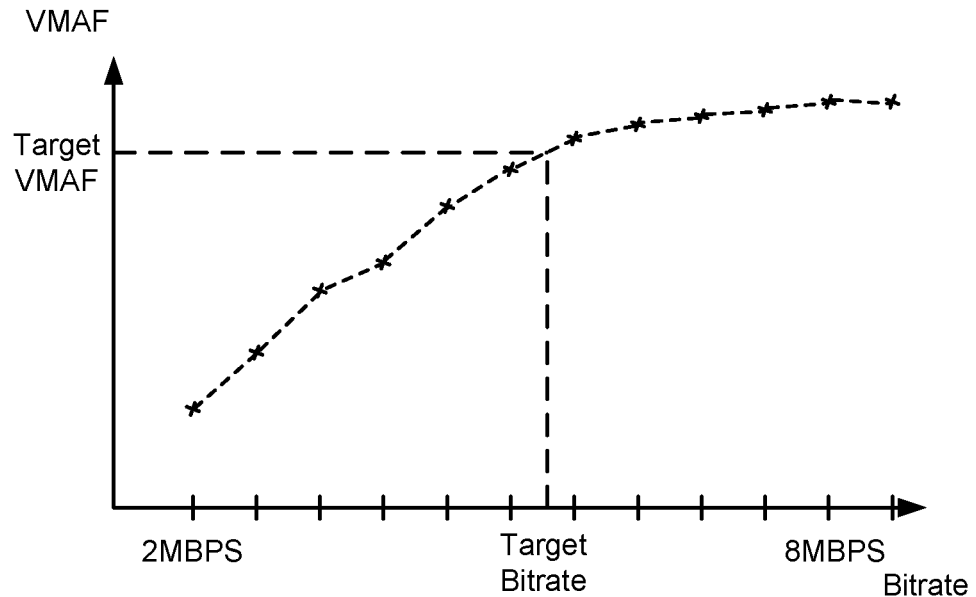
FIGS. 6A and 6B are example representations corresponding to two alternative processes, linear piecewise (FIG. 6A) or nonlinear function (e.g., a polynomial curve) (FIG. 6B), which can be used to determine a starting, target bitrate of a candidate adaptive bitrate ladder, in accordance with various aspects and example implementations of the subject disclosure.
Figure 6B:
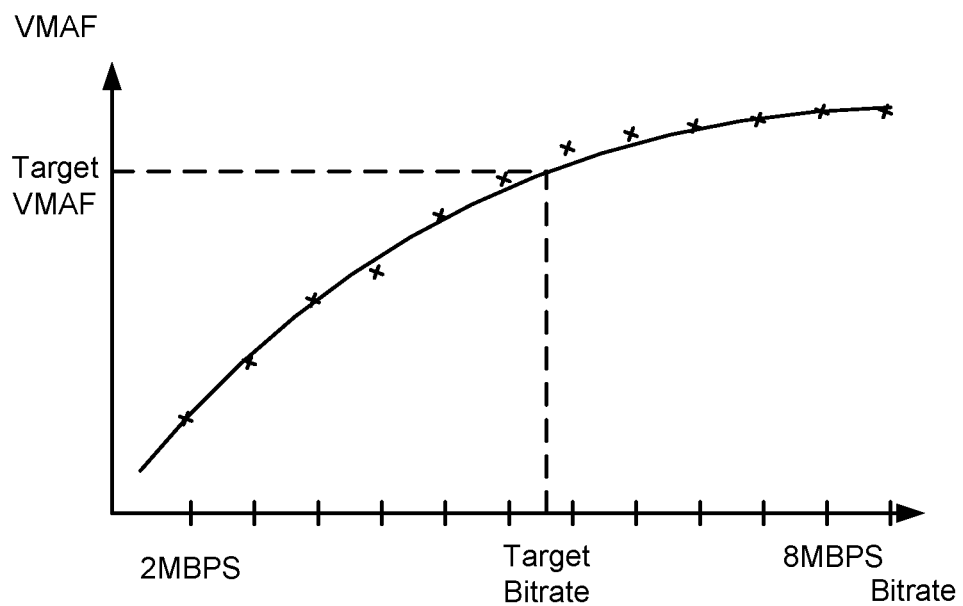

As shown in FIG. 6A or FIG. 6B, using the bitrates and VMAF scores from the above table as R-D points, the process logically builds a piecewise linear model for the R-D points (FIG. 6A), or in an alternative implementation builds a nonlinear function (e.g., a polynomial curve) that represents these R-D points (FIG. 6B). Using a piecewise linear model has shown to result in better estimates. Note that FIGS. 6A and 6B are only for purposes of illustration, and are not intended to reflect any actual R-D points nor those in the above table.

For the piecewise linear alternative the (bitrate, VMAF) combinations are modeled by taking adjacent points and treating them as a linear equation, thereby providing the ability to derive linear equation coefficients for each pair of points. Then based on the target VMAF, a piecewise line to use to derive the bitrate that can be used as the starting point for the adaptive bitrate ladder.

For the nonlinear function alternative, each data point (bitrate, VMAF) combination can be used to find a function such as a polynomial curve that fit these points, that is, using a polynomial fit. For example, with the coefficients of a polynomial, a desired value of VMAF can be plugged in, which determines the corresponding bitrate for this curve that can be used as the starting point of the adaptive bitrate ladder.

More particularly, given the target VMAF (e.g., 92), the operations of FIG. 7 determine the target bitrate. Operation 702 represents building the set of R-D points as described above. At operation 704, if the target VMAF is higher than the highest VMAF on the R-D points, at operation 706 the process selects a default TOP ladder (shown in the "Ladder Ratio" table below), and the process ends with this as the final adaptive bitrate stack for this title. If instead at operation 708 the target VMAF is below the lowest VMAF on the R-D points, the bitrate corresponding to the lowest VMAF score is used as the starting point for the candidate adaptive bitrate (ABR) stack.

If none of the above conditions evaluated at operation 704 and/or 706 are satisfied, operation 712 finds the two points between which the target VMAF lies, and finds the linear equation of the line connecting them. The target bit rate is found given the target VMAF from this linear equation as in the example of FIG. 6A (or similarly in the alternative implementation, via the nonlinear function in the example FIG. 6B).

With the target top bit rate, the process operates to develop a candidate adaptive bitrate stack. However, note that in one implementation a limit is first checked, namely if the target bitrate is 8250 k or above, the TOP default ladder is used.

If not 8250 k or above, the set of bitrates to use as candidates is derived at operation 714, starting with the target bitrate, going down using a fixed ratio between each bit rate, as shown in the "Ladder Ratio" table below. Note that if the target bitrate is less than or equal to 5500 k, the process starts with 0.74 as the ratio, otherwise the process starts from 0.67, and goes down from there. The process continues until the lowest bit rate is reached, e.g., a stopping point of 200 is reached.

As is understood, the ratios can be precomputed into fractional values multiplied by the target bitrate, which can be stored in an array or the like. For example, target bitrate times 0.74, target bitrate times 0.5476 ($=0.74^2$); target bitrate times 0.405224 ($=0.74^3$), and so on, e.g., target bitrate times $0.74^N$ with N increasing by 1 until the stopping point is reached. Similarly, values for $0.67^N$ can be precomputed.

In any event, in one implementation the set of bitrates to use as candidates bitrates are descending values (e.g., ratios) multiplied by of the target bitrate, whether indirect multiplication, (target bitrate times value is candidate bitrate 1, candidate bitrate 1 times value is candidate bitrate 2, and so on), or direct multiplication (e.g., using successive $ratio^N$ values). It should be noted, however, that the technology described herein is not limited to a fixed ratio (that is, not corresponding to the example ratios of 0.74 or 0.67), but can be variable, e.g., target bitrate times 0.77 is candidate bitrate 1, candidate bitrate 1 times 0.72 is candidate bitrate 2, and so on, in which the multiplier can vary as the candidate bitrates are determined by stepping down from the target bitrate.

Ladder Ratio

```
TOP_LADDER_INFO = [
    {'width': 1920, 'height': 1080, 'br': 8250,
     'low_2_high': -1, 'high_2_low': -1, 'bpp': 0.17},
    {'width': 1920, 'height': 1080, 'br': 5500,
     'low_2_high': 0.67, 'high_2_low': 1.50, 'bpp': 0.11},
    {'width': 1280, 'height': 720, 'br': 3400,
     'low_2_high': 0.62, 'high_2_low': 1.62, 'bpp': 0.15},
    {'width': 1280, 'height': 720, 'br': 2500,
     'low_2_high': 0.74, 'high_2_low': 1.36, 'bpp': 0.11},
    {'width': 960, 'height': 540, 'br': 1800,
     'low_2_high': 0.72, 'high_2_low': 1.39, 'bpp': 0.14},
```

-continued

| Ladder Ratio |
|---|
| {'width': 768, 'height': 432, 'br': 1200, 'low_2_high': 0.67, 'high_2_low': 1.50, 'bpp': 0.15}, {'width': 640, 'height': 360, 'br': 800, 'low_2_high': 0.67, 'high_2_low': 1.50, 'bpp': 0.14}, {'width': 416, 'height': 234, 'br': 400, 'low_2_high': 0.50, 'high_2_low': 2.00, 'bpp': 0.17} ] |

Once there is a list of candidate bit rates, a resolution to use needs to be determined for candidate bit rates. To do this, in one implementation, the following data structure (e.g., a table) is used, which defines an acceptable bitrate range for each resolution. This range has been empirically derived.

| Resolution to Bitrate Range |
|---|
| RES_TO_BR_RANGE = [ {'width': 1920, 'height': 1080, 'brmax': 8250, 'brmin': 2200}, {'width': 1280, 'height': 720, 'brmax': 3400, 'brmin': 1300}, {'width': 960, 'height': 540, 'brmax': 1800, 'brmin': 800}, {'width': 768, 'height': 432, 'brmax': 1200, 'brmin': 400}, {'width': 640, 'height': 360, 'brmax': 800, 'brmin': 300}, {'width': 416, 'height': 234, 'brmax': 400, 'brmin': 200} ] |

For each bitrate in the bitrate ladder derived in operation 714, at operation 716 the process checks which resolution is suitable for that bitrate based on the above "Resolution to Bitrate Range" data structure (table). This produces a list of one or more resolutions that can potentially be used for a bitrate. For example, consider that a candidate bitrate ("target_br_kbps") is 2633 k; this bitrate fits into the ranges of two resolutions, 1920×1080 and 1280×720. Both resolutions are added to the candidate adaptive bitrate stack as candidates for this bitrate.

In one example implementation, a first pruning step is performed, which allows a resolution to appear no more than m times consecutively; (in one implementation, m equals two). For example, if 1920×1080 is a candidate resolution for three bitrates of 7000 k, 5500 k and 2300 k, if m=2 then 2300 k is removed as a candidate, as only the top two bitrates are kept as candidates. Once this is done, for each target bitrate there is a corresponding set of one or more target resolutions.

The following table shows an example of such a candidate ladder:

| Candidate Ladder: |
|---|
| { "title_id": "title_01.mxf", "title_name": "title_01.mxf", "target_ladder": [ { "target_br_kbps": 4246, "candidate_res": [ { "width": 1920, "height": 1080 } ] }, { "target_br_kbps": 2633, "candidate_res": [ |

-continued

| Candidate Ladder: |
|---|
| { "width": 1920, "height": 1080 }, { "width": 1280, "height": 720 } ] }, { "target_br_kbps": 1948, "candidate_res": [ { "width": 1280, "height": 720 } ] }, { "target_br_kbps": 1403, "candidate_res": [ { "width": 960, "height": 540 } ] }, { "target_br_kbps": 940, "candidate_res": [ { "width": 960, "height": 540 }, { "width": 768, "height": 432 } ] }, { "target_br_kbps": 630, "candidate_res": [ { "width": 768, "height": 432 }, { "width": 640, "height": 360 } ] }, { "target_br_kbps": 315, "candidate_res": [ { "width": 640, "height": 360 }, { "width": 416, "height": 234 } ] } ] } |

Figure 8:
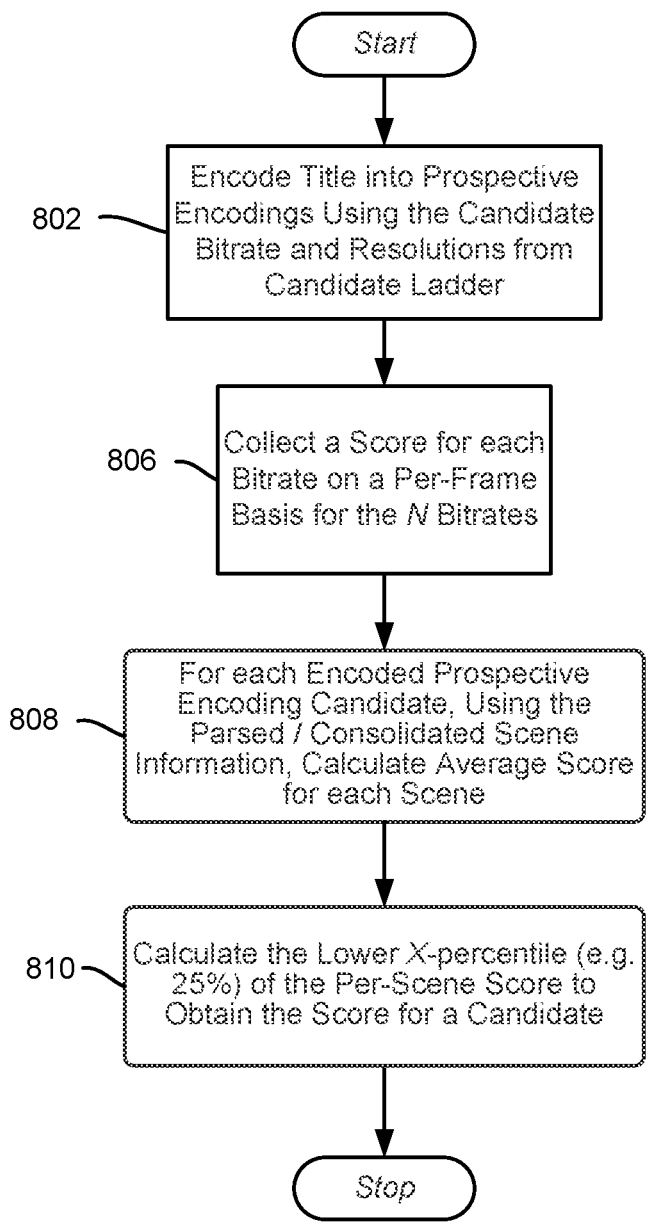
FIG. 8 is a flow diagram of example operations that may be performed to encode a title based on the bitrates and resolutions in the candidate adaptive bitrate stack to obtain scores for the candidate encodings, in accordance with various aspects and example implementations of the subject disclosure.

In a next operation, corresponding to operation 108 of FIG. 1, the candidate stack is used to encode the title at the various bitrates and resolutions in the candidate stack into prospective (candidate) encodings. This is shown at operation 802 of FIG. 8. In other words, the candidate ladder is encoded with the production configuration. As part of this process, operation 806 collects the per-frame VMAF score for each bitrate and resolution.

Operation 808 represents, for each prospective encoding, using the parsed/consolidated scene information to calculate an average score (e.g., based on an objective and/or subjective score) for each scene. Note that the scene information obtained from the initial CRF encode of the title can be reused. Further, note that this is similar to operation 506 of FIG. 5, except that now the candidate-based bitrate and resolution encodings are being used, instead of the variable bitrate encodings. Also similar to FIG. 5, a final score for each candidate is obtained, e.g., by calculating the lower X-percentile (e.g. X=25) of the per-scene score to obtain the score for a candidate. Note that a different percentile can be used from that of FIG. 5.

Figure 9:
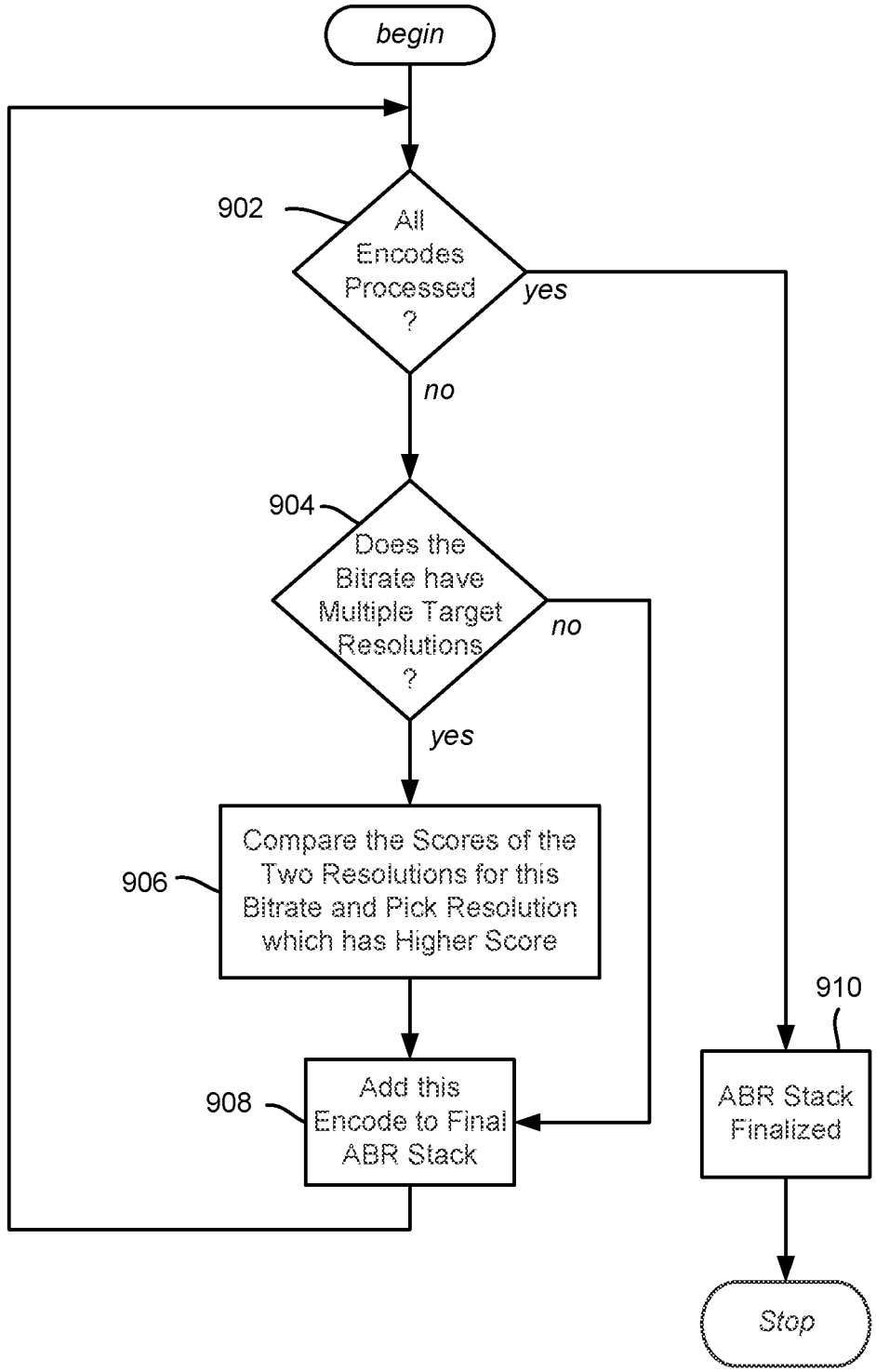
FIG. 9 is flow diagram of example operations that may be used to prune a candidate adaptive bitrate stack into a final bitrate stack, which can be based on the scores for the candidate encodings, in accordance with various aspects and example implementations of the subject disclosure.

In a final pruning process corresponding to operation 110 of FIG. 1, FIG. 9 represents using the scores of the prospective encodings to process the candidate stack into the final adaptive bitrate stack until no prospective encodings remain, as evaluated by operation 902. Operation 904 represents determining whether a candidate bitrate has multiple candidate resolutions. If so, the candidate resolution for that bitrate with the highest score (e.g., the VMAF score) is selected for pairing with that bitrate in the final adaptive bitrate (ABR) stack at operation 908, (and the other resolution and its corresponding prospective encoding basically discarded). If a bitrate does not have multiple candidate resolutions, operations 904 and 908 select that bitrate and resolution as is.

It should be noted that quality (or other final) scores may not be needed for prospective encodings that do not have multiple resolution candidates for a single bitrate. Indeed, if the only use of such a score for comparing two prospective encodings is a tiebreaker when there are multiple resolution candidates for a single bitrate, then a score is not needed for a prospective encoding for a bitrate with only a single candidate resolution. In such an instance, the prospective encoding can be used as an actual encoding with its corresponding candidate bitrate and candidate resolution included as a selected bitrate and resolution in the final adaptive bitrate stack.

At this point, the result is a final adaptive bitrate stack in which each bitrate has a single resolution, and the remaining prospective encodings for those bitrate, resolution pairings are now the actual encodings to be used. This final adaptive bitrate stack is associated with the title for use when streaming from the actual encodings to the customer devices.

Figure 10:
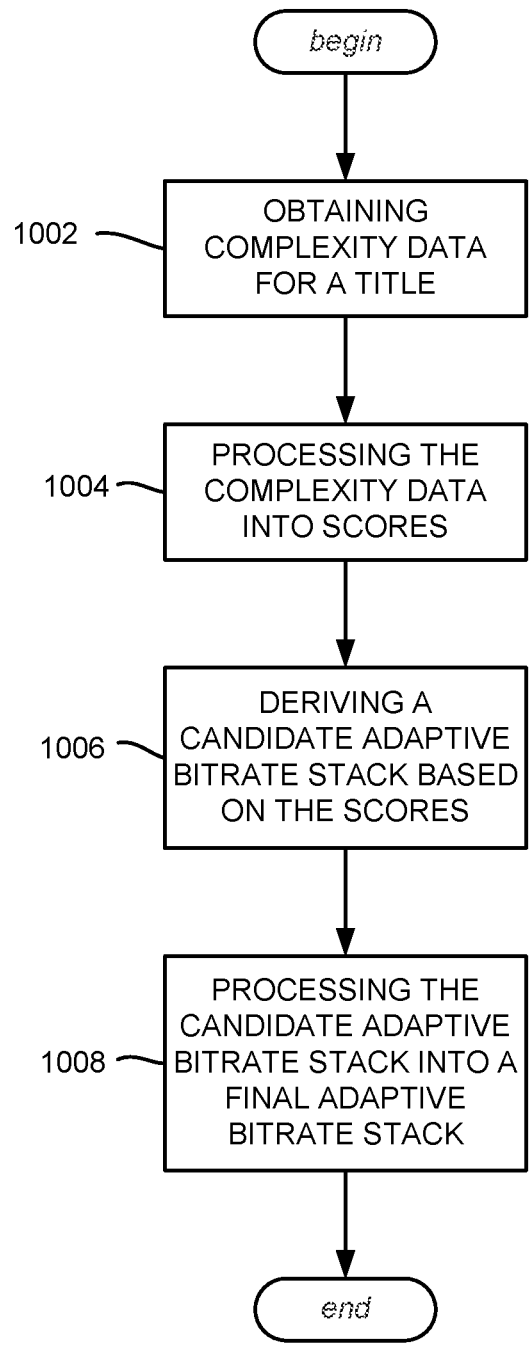
FIG. 10 is a flow diagram showing example operations directed towards obtaining an adaptive bitrate stack for a title based on complexity data obtained for that title, in accordance with various aspects and example implementations of the subject disclosure.

One or more example aspects, such as corresponding to operations of a method, are represented in FIG. 10. Operation 1002 represents obtaining complexity data for a title. Operation 1004 represents processing the complexity data into scores. Operation 1006 represents deriving a candidate adaptive bitrate stack based on the scores. Operation 1008 represents processing the candidate adaptive bitrate stack into a final adaptive bitrate stack.

Obtaining complexity data for the title can comprise encoding the title at different bitrates into different encodings. Processing the complexity data into the scores can comprise determining scenes of the title, and determining for respective different encodings, based on the scenes, respective final scores based on respective per-scene-based scores for the scenes of the respective different encodings.

Deriving the candidate adaptive bitrate stack based on the scores can comprise determining a target bitrate based on the scores, and determining candidate bitrates for the candidate adaptive bitrate stack based on the target bitrate. Obtaining the complexity data for the title can comprise encoding the title at different respective bitrates into different respective encodings and associating respective scores with respective encodings, and wherein the determining the target bitrate can comprise using the scores and bitrates of the encodings as bitrate, score pairs of data points, and determining the target bitrate based on a target score and a function associated with the data points. Determining the candidate bitrates for the candidate adaptive bitrate stack based on the target bitrate can comprise, starting with the target bitrate as a highest candidate bitrate, successively determining lower target candidate bitrates by multiplying each directly higher candidate bitrate by a fixed ratio until a lower bitrate stopping point is reached.

Deriving the candidate adaptive bitrate stack further can comprise accessing a resolution range data structure to determine one or more candidate resolutions corresponding to each candidate bitrate in the candidate adaptive bitrate stack. Aspects can comprise removing at least one candidate bitrate for a candidate resolution from the candidate adaptive bitrate stack if the candidate resolution has more than a threshold number candidate bitrates associated with the candidate resolution.

Processing the candidate adaptive bitrate stack into a final adaptive bitrate stack can comprise encoding the title with candidate bitrates and candidate resolutions of the candidate stack into prospective encodings, associating scores with the prospective encodings, and for any prospective encoding having a corresponding candidate bitrate and multiple candidate resolutions, including only the candidate bitrate and one of the resolutions in the final adaptive bitrate stack based on a highest score.

Aspects can comprise associating the final adaptive bitrate stack with the title, streaming first content of the title to a device based on a first resolution and bitrate pairing included in the final adaptive bitrate stack, receiving a request from the device corresponding to a different resolution and bitrate pairing included in the final adaptive bitrate stack, and in response to the request, streaming second content of the title to the device based on the different resolution and bitrate pairing.

Figure 11:
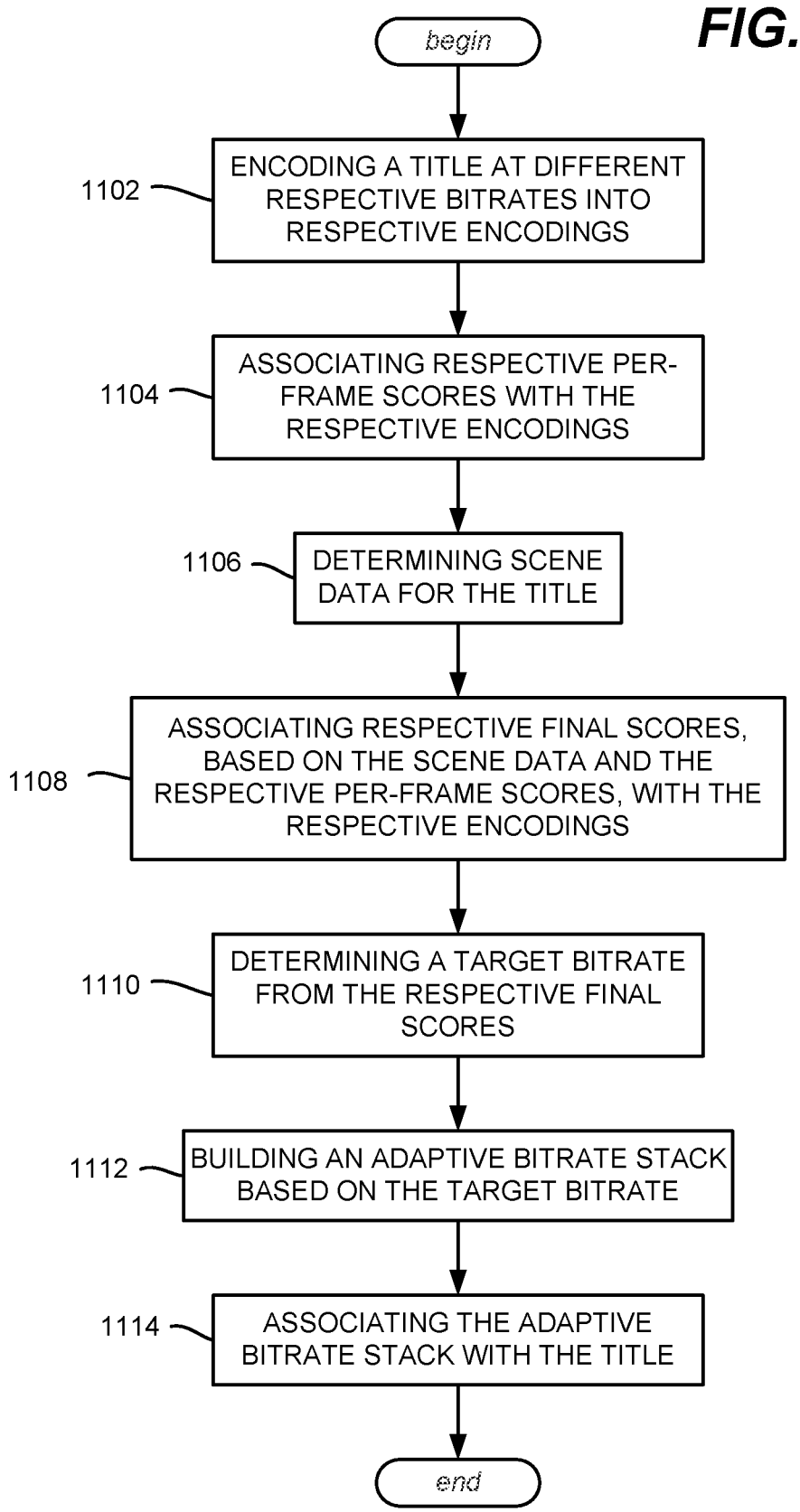
FIG. 11 is a flow diagram showing example operations directed towards obtaining scores for different encodings of a title, using the scores to determine a target bitrate, and building an adaptive bitrate stack for a title based on the target bitrate, in accordance with various aspects and example implementations of the subject disclosure.

One or more aspects can be embodied in a system, such as represented in FIG. 11, and for example can comprise a memory that stores computer executable components/instructions, and a processor that executes computer executable components/instructions stored in the memory to perform operations. Example operations can comprise operation 1102, which represents encoding a title at different respective bitrates into respective encodings. Operation 1104 represents associating respective per-frame scores with the respective encodings. Operation 1106 represents determining scene data for the title. Operation 1108 represents associating respective final scores, based on the scene data and the respective per-frame scores, with the respective encodings. Operation 1110 represents determining a target bitrate from the respective final scores. Operation 1112 represents building an adaptive bitrate stack based on the target bitrate. Operation 1114 represents associating the adaptive bitrate stack with the title.

Determining the scene data for the title can comprise consolidating two short scenes into a single scene.

Associating the respective final scores with the respective encodings can comprise determining respective per-scene scores for the respective encodings, and using a lower percentile of the respective per-scene scores to determine the respective final scores.

Determining the target bitrate from the final scores can comprise using the respective final scores and respective bitrates of the respective encodings as respective data point pairs that correspond to a nonlinear function or piecewise linear function, and determining the target bitrate based on a relationship of a target score relative to the nonlinear function or the piecewise linear function.

Building the adaptive bitrate stack based on the target bitrate can comprise determining respective candidate bitrates based on the target bitrate, building a candidate ladder comprising associating the respective candidate bitrates with one or more respective candidate resolutions, and processing the candidate ladder into the adaptive bitrate stack by selecting, for each candidate bitrate that has more than one candidate resolution, only one candidate resolution as a selected resolution included in the adaptive bitrate stack. Selecting the only one candidate resolution can comprise selecting, for each candidate bitrate that has more than one candidate resolution, a selected bitrate and selected resolution based on a highest score of one prospective encoding encoded via the selected bitrate and the selected resolution relative to a lower score of each other prospective encoding encoded via the selected bitrate and a different candidate resolution.

The respective per-frame scores can comprise Video Multimethod Assessment Fusion (VMAF) scores. Other objective and/or subjective scores/scoring metrics that can be used, alone or in combination with other scoring mechanisms, can include but are not limited to peak signal-to-noise ratio (PSNR), structural similarity index (SSIM), SSIM-PLUS, mean opinion score (MOS), or difference mean opinion score (DMOS).

Figure 12:
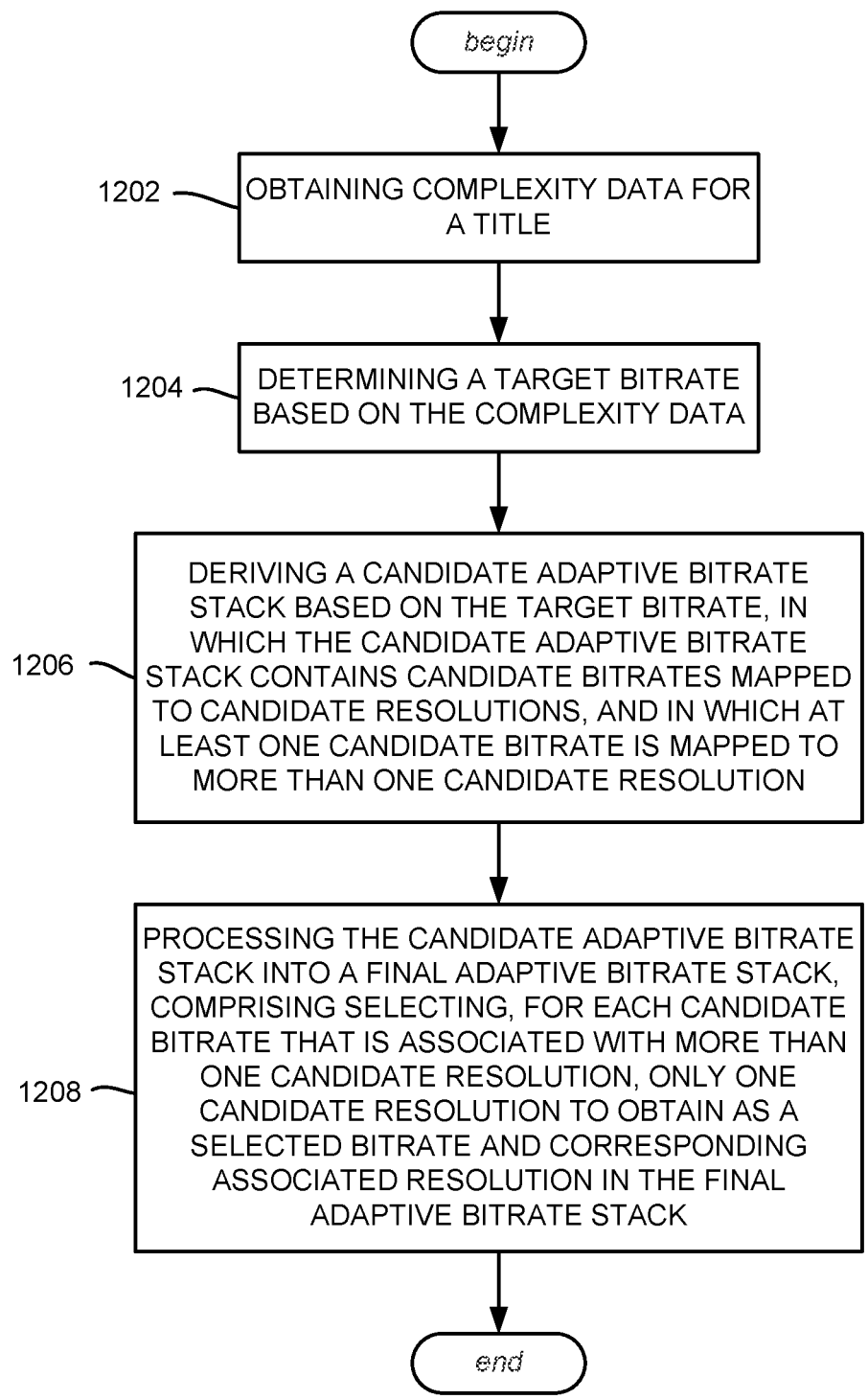
FIG. 12 is a flow diagram showing example operations directed towards deriving a candidate adaptive bitrate stack based on a target bitrate determined from complexity data of that title, and processing the candidate adaptive bitrate stack into a final adaptive bitrate stack for the title, in accordance with various aspects and example implementations of the subject disclosure.

FIG. 12 summarizes various example operations, e.g., corresponding to executable instructions of a machine-readable storage medium, in which the executable instructions, when executed by a processor, facilitate performance of example operations. Operation 1202 represents obtaining complexity data for a title. Operation 1204 represents determining a target bitrate based on the complexity data. Operation 1205 represents deriving a candidate adaptive bitrate stack based on the target bitrate, in which the candidate adaptive bitrate stack contains candidate bitrates mapped to candidate resolutions, and in which at least one candidate bitrate is mapped to more than one candidate resolution. Operation 1208 represents processing the candidate adaptive bitrate stack into a final adaptive bitrate stack, comprising selecting, for each candidate bitrate that is associated with more than one candidate resolution, only one candidate resolution to obtain as a selected bitrate and corresponding associated resolution in the final adaptive bitrate stack.

Further operations can comprise, encoding multiple respective prospective encodings using a bitrate from the candidate adaptive bitrate stack and the more than one candidate resolutions associated with that bitrate, determining respective scores for the respective prospective encodings; selecting, for each candidate bitrate that is associated with more than one candidate resolution, only one candidate resolution can comprise selecting a selected resolution for the candidate bitrate based on the respective scores of the respective prospective encodings.

Deriving the candidate adaptive bitrate stack based on the target bitrate can comprise determining a group of candidate bitrates for the candidate adaptive bitrate stack based on the target bitrate multiplied by descending values, and selecting one or more candidate resolutions for each of the candidate bitrates based on mapping each candidate bitrate to one or more desirable resolutions for that bitrate.

Determining the target bitrate based on the complexity data can comprise associating respective different bitrate encodings of the title with respective final scores, using the respective final scores and respective bitrates of the respective encodings as respective data point pairs that correspond to a nonlinear function or piecewise linear function, and determining the target bitrate based on a relationship of a target score relative to the nonlinear function or the piecewise linear function.

As can be seen, there is described a technology, for determining a more optimal adaptive bitrate stack on a per-title basis, using complexity information obtained from the title's content. The technology facilitates saving of bits for both storage and for streaming to customers, while maintaining a high quality video content stream to the extent possible.

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 13 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 13:
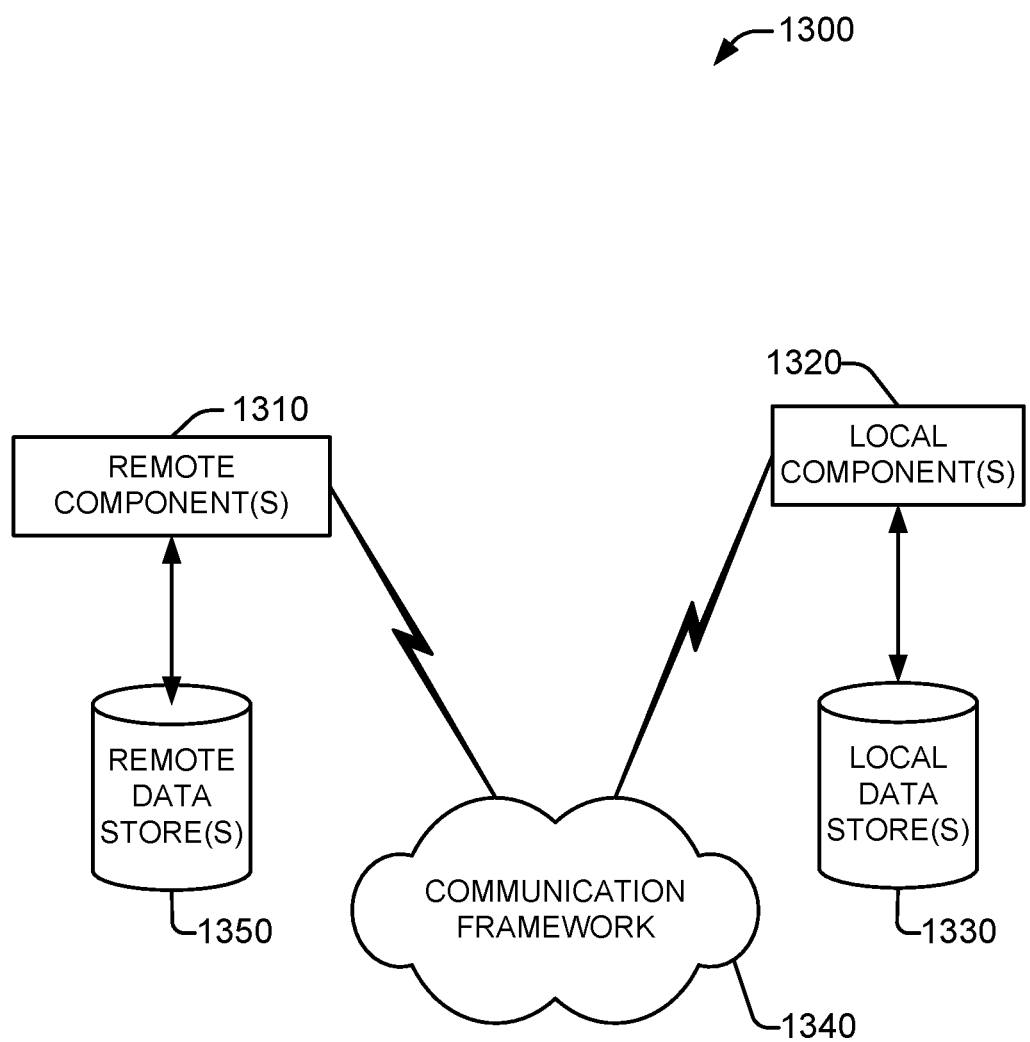
FIG. 13 is a block diagram representing an example computing environment into which aspects of the subject matter described herein may be incorporated.

FIG. 13 thus illustrates a schematic block diagram of a computing environment 1300 with which the disclosed subject matter can interact. The system 1300 comprises one or more remote component(s) 1310. The remote component(s) 1310 can be hardware and/or software (e.g., threads, processes, computing devices). In some embodiments, remote component(s) 1310 can be a distributed computer system, connected to a local automatic scaling component and/or programs that use the resources of a distributed computer system, via communication framework 1340. Communication framework 1340 can comprise wired network devices, wireless network devices, mobile devices, wearable devices, radio access network devices, gateway devices, femtocell devices, servers, etc.

The system 1300 also comprises one or more local component(s) 1320. The local component(s) 1320 can be hardware and/or software (e.g., threads, processes, computing devices). In some embodiments, local component(s) 1320 can comprise an automatic scaling component and/or programs that communicate/use the remote resources 1310 and 1320, etc., connected to a remotely located distributed computing system via communication framework 1340.

One possible communication between a remote component(s) 1310 and a local component(s) 1320 can be in the form of a data packet adapted to be transmitted between two or more computer processes. Another possible communication between a remote component(s) 1310 and a local component(s) 1320 can be in the form of circuit-switched data adapted to be transmitted between two or more computer processes in radio time slots. The system 1300 comprises a communication framework 1340 that can be employed to facilitate communications between the remote component(s) 1310 and the local component(s) 1320, and can comprise an air interface, e.g., Uu interface of a UMTS network, via a long-term evolution (LTE) network, etc. Remote component(s) 1310 can be operably connected to one or more remote data store(s) 1350, such as a hard drive, solid state drive, SIM card, device memory, etc., that can be employed to store information on the remote component(s) 1310 side of communication framework 1340. Similarly, local component(s) 1320 can be operably connected to one or more local data store(s) 1330, that can be employed to store information on the local component(s) 1320 side of communication framework 1340.

Figure 14:
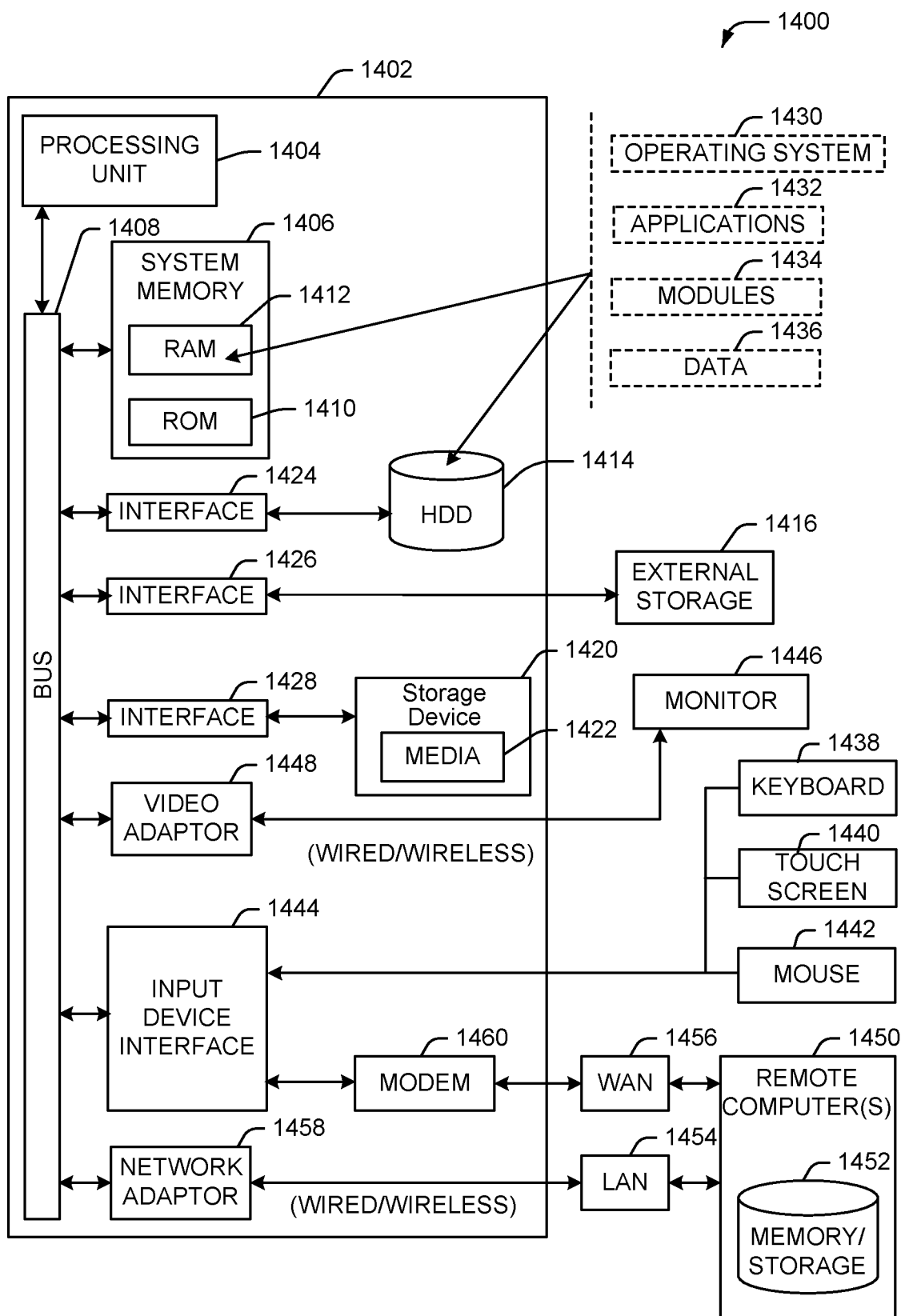
FIG. 14 depicts an example schematic block diagram of a computing environment with which the disclosed subject

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), and can include one or more external storage devices 1416 (e.g., a magnetic floppy disk drive (FDD) 1416, a memory stick or flash drive reader, a memory card reader, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414.

Other internal or external storage can include at least one other storage device 1420 with storage media 1422 (e.g., a solid state storage device, a nonvolatile memory device, and/or an optical disk drive that can read or write from removable media such as a CD-ROM disc, a DVD, a BD, etc.). The external storage 1416 can be facilitated by a network virtual machine. The HDD 1414, external storage device(s) 1416 and storage device (e.g., drive) 1420 can be connected to the system bus 1408 by an HDD interface 1424, an external storage interface 1426 and a drive interface 1428, respectively.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather is to be construed in breadth, spirit and scope in accordance with the appended claims.

What is claimed is:

1. A system, comprising:
a processor; and
a memory that stores executable instructions that, when executed by the processor, facilitate performance of operations, the operations comprising:
obtaining complexity data for a title;
processing the complexity data into scores;
deriving a candidate adaptive bitrate stack based on the scores;
performing a first pruning of bitrate and resolution combinations of the candidate adaptive bitrate stack based on a duplicate resolution threshold for any resolution in the candidate adaptive bitrate stack;
performing a second pruning of the candidate adaptive bitrate stack based on encoding values assigned to remaining bitrate and resolution combinations of the candidate adaptive bitrate stack; and
processing the candidate adaptive bitrate stack into a final adaptive bitrate stack.

2. The system of claim 1, wherein the obtaining of the complexity data for the title comprises encoding the title at different bitrates into different encodings.

3. The system of claim 2, wherein the processing of the complexity data into the scores comprises determining scenes of the title, and determining, for respective encodings of the different encodings, based on the scenes, respective final scores based on respective per-scene-based scores for the scenes of the respective encodings of the different encodings.

4. The system of claim 1, wherein the deriving of the candidate adaptive bitrate stack based on the scores comprises determining a target bitrate based on the scores, and determining candidate bitrates for the candidate adaptive bitrate stack based on the target bitrate.

5. The system of claim 4, wherein the obtaining of the complexity data for the title comprises encoding the title at different respective bitrates into different respective encodings and associating respective scores with respective encodings, and wherein the determining of the target bitrate comprises using the scores and bitrates of the encodings as bitrate, score pairs of data points, and determining the target bitrate based on a target score and a function associated with the data points.

6. The system of claim 4, wherein the determining of the candidate bitrates for the candidate adaptive bitrate stack based on the target bitrate comprises, starting with the target bitrate as a highest candidate bitrate, successively determining lower target candidate bitrates by multiplying each directly higher candidate bitrate by a fixed ratio until a lower bitrate stopping point is reached.

7. The system of claim 4, wherein the deriving of the candidate adaptive bitrate stack further comprises accessing a resolution range data structure to determine one or more candidate resolutions corresponding to each candidate bitrate in the candidate adaptive bitrate stack.

8. The system of claim 1, wherein the processing of the candidate adaptive bitrate stack into the final adaptive bitrate stack comprises encoding the title with candidate bitrates and candidate resolutions of the candidate stack into prospective encodings, associating scores with the prospective encodings, and wherein performing the first pruning and the second pruning comprise for any prospective encoding having a corresponding candidate bitrate and multiple candidate resolutions, including only the candidate bitrate and one of the resolutions in the final adaptive bitrate stack based on a highest score.

9. The system of claim 1, wherein the operations further comprise associating the final adaptive bitrate stack with the title, streaming first content of the title to a device based on a first resolution and bitrate pairing included in the final adaptive bitrate stack, receiving a request from the device corresponding to a different resolution and bitrate pairing included in the final adaptive bitrate stack, and, in response to the request, streaming second content of the title to the device based on the different resolution and bitrate pairing.

10. The system of claim 1, wherein the scores are based on at least one of: Video Multimethod Assessment Fusion (VMAF) scores, Video Multimethod Assessment Fusion (VMAF) scores, peak signal-to-noise ratio (PSNR) scores, structural similarity index (SSIM) scores, SSIMPLUS scores, mean opinion score (MOS) scores, or difference mean opinion score (DMOS) scores.

11. A method, comprising:
deriving, by a system comprising a processor, a candidate adaptive bitrate stack based on complexity data associated with a title, the deriving comprising:
encoding the title at different respective bitrates into respective encodings;
associating respective per-frame scores, based on the complexity data, with the respective encodings;
determining scene data for the title;
associating respective final scores, based on the scene data and the respective per-frame scores, with the respective encodings;
determining a target bitrate from the respective final scores;
building an adaptive bitrate stack based on the target bitrate,
wherein the building comprises:
performing a first pruning of bitrate and resolution combinations of a candidate adaptive bitrate stack based on a duplicate resolution threshold for any resolution in the candidate adaptive bitrate stack,
performing a second pruning of the candidate adaptive bitrate stack based on encoding values of the respective encodings that are assigned to remaining bitrate and resolution combinations of the candidate adaptive bitrate stack; and
associating the adaptive bitrate stack with the title.

12. The method of claim 11, wherein the determining of the scene data for the title comprises consolidating two or more short scenes into a single scene.

13. The method of claim 11, wherein the associating of the respective final scores with the respective encodings comprises determining respective per-scene scores for the respective encodings, and using a lower percentile of the respective per-scene scores to determine the respective final scores.

14. The method of claim 11, wherein the determining of the target bitrate from the final scores comprises using the respective final scores and respective bitrates of the respective encodings as respective data point pairs that correspond to a nonlinear function or piecewise linear function, and determining the target bitrate based on a relationship of a target score relative to the nonlinear function or the piecewise linear function.

15. The method of claim 11, wherein the building of the adaptive bitrate stack based on the target bitrate comprises determining respective candidate bitrates based on the target bitrate, building a candidate ladder comprising associating the respective candidate bitrates with one or more respective candidate resolutions, and processing the candidate ladder into the adaptive bitrate stack by performing the first pruning and the second pruning.

16. The method of claim 15, wherein the performing the second pruning comprises selecting, for each candidate bitrate that has more than one candidate resolution, a selected bitrate and selected resolution based on a highest score of one prospective encoding encoded via the selected bitrate and the selected resolution relative to a lower score of each other prospective encoding encoded via the selected bitrate and a different candidate resolution.

17. A non-transitory machine-readable storage medium, comprising executable instructions that, when executed by a processor, facilitate performance of operations, the operations comprising:
deriving a candidate adaptive bitrate stack for association with a title, the deriving comprising:
obtaining complexity data for the title;
determining a target bitrate based on the complexity data;
using the target bitrate to determine the candidate adaptive bitrate stack, wherein the candidate adaptive bitrate stack contains candidate bitrates mapped to candidate resolutions, and in which at least one candidate bitrate is mapped to more than one candidate resolution; and processing the candidate adaptive bitrate stack into a final adaptive bitrate stack, comprising pruning a set of bitrate and resolution combinations of the candidate adaptive bitrate stack by selecting, for each combination having a candidate bitrate, only one combination having that candidate bitrate to provide as a selected bitrate and resolution combination of a set of bitrate and resolution combinations in the final adaptive bitrate stack.

18. The non-transitory machine-readable storage medium of claim 17, wherein the operations further comprise, encoding multiple respective prospective encodings using a bitrate from the candidate adaptive bitrate stack and the more than one candidate resolutions associated with that bitrate, determining respective scores for the respective prospective encodings, and wherein the selecting, for each candidate bitrate that is associated with more than one candidate resolution, only one candidate resolution comprises selecting a selected resolution for the candidate bitrate based on the respective scores of the respective prospective encodings.

19. The non-transitory machine-readable storage medium of claim 17, wherein the using of the target bitrate to determine the candidate adaptive bitrate stack comprises determining a group of candidate bitrates for the candidate adaptive bitrate stack based on the target bitrate multiplied by descending values, and selecting one or more candidate resolutions for each of the candidate bitrates based on mapping each candidate bitrate to one or more desirable resolutions for that bitrate.

20. The non-transitory machine-readable storage medium of claim 17, wherein the determining of the target bitrate based on the complexity data comprises associating respective different bitrate encodings of the title with respective final scores, using the respective final scores and respective bitrates of the respective encodings as respective data point pairs that correspond to a nonlinear function or piecewise linear function, and determining the target bitrate based on a relationship of a target score relative to the nonlinear function or the piecewise linear function.

* * * * *